(12) United States Patent
Liu et al.

(10) Patent No.: US 11,885,387 B2
(45) Date of Patent: Jan. 30, 2024

(54) FRICTION MATERIAL AND PREPARATION METHOD THEREFOR, AND FRICTION PART

(71) Applicant: Otis Elevator Company, Farmington, CT (US)

(72) Inventors: Ruguang Liu, Tianjin (CN); Guochen Gao, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 48 days.

(21) Appl. No.: 17/832,281

(22) Filed: Jun. 3, 2022

(65) Prior Publication Data

US 2023/0134070 A1    May 4, 2023

(30) Foreign Application Priority Data

Nov. 3, 2021 (CN) .......................... 202111292801.6

(51) Int. Cl.
*F16D 69/02* (2006.01)
*C08L 9/02* (2006.01)

(52) U.S. Cl.
CPC ............... *F16D 69/02* (2013.01); *C08L 9/02* (2013.01)

(58) Field of Classification Search
CPC ..................................................... F16D 69/02
See application file for complete search history.

(56) References Cited

U.S. PATENT DOCUMENTS

| 2,968,588 A | 12/1955 | Baldwin et al. |
| 8,020,669 B2 | 9/2011 | Aulanko et al. |

FOREIGN PATENT DOCUMENTS

| CN | 101759887 A | | 6/2010 |
| CN | 101981909 A | | 2/2011 |
| CN | 102140188 A | * | 8/2011 |
| CN | 103102611 A | | 5/2013 |
| CN | 104194087 A | | 12/2014 |
| CN | 104744751 A | | 7/2015 |
| CN | 104893018 A | | 9/2015 |
| CN | 104945702 A | | 9/2015 |
| CN | 105255088 A | | 1/2016 |
| CN | 106436394 A | | 2/2017 |
| CN | 106751435 A | | 5/2017 |
| CN | 111961945 A | | 11/2020 |
| CN | 112143132 A | | 12/2020 |
| IN | 00485KO2006 | | 4/2009 |

OTHER PUBLICATIONS

Machine translation of CN 104194087 A, published Dec. 10, 2014, retrieved from espacenet on Sep. 13, 2023.*

* cited by examiner

*Primary Examiner* — Vickey Nerangis

(74) *Attorney, Agent, or Firm* — CANTOR COLBURN LLP

(57) ABSTRACT

A friction material, a preparation method therefor, and a friction part. The friction material contains the following components by weight percentage: 24%-31% of a nitrile rubber, 0.35%-1% of a vulcanizing agent, 0.35%-0.6% of a vulcanization activator, 0.4%-0.8% of a promoter, 0.06%-0.11% of a scorch inhibitor, 1.5%-2.4% of ZnO, 24%-31% of a thermoplastic phenolic resin, 1.5%-2.2% of a plasticizer and 15%-25% of white carbon black, and optionally: 0%-25% of a filler, 0-0.8% of an anti-aging agent, and 0-2.4% of MgO.

18 Claims, 1 Drawing Sheet

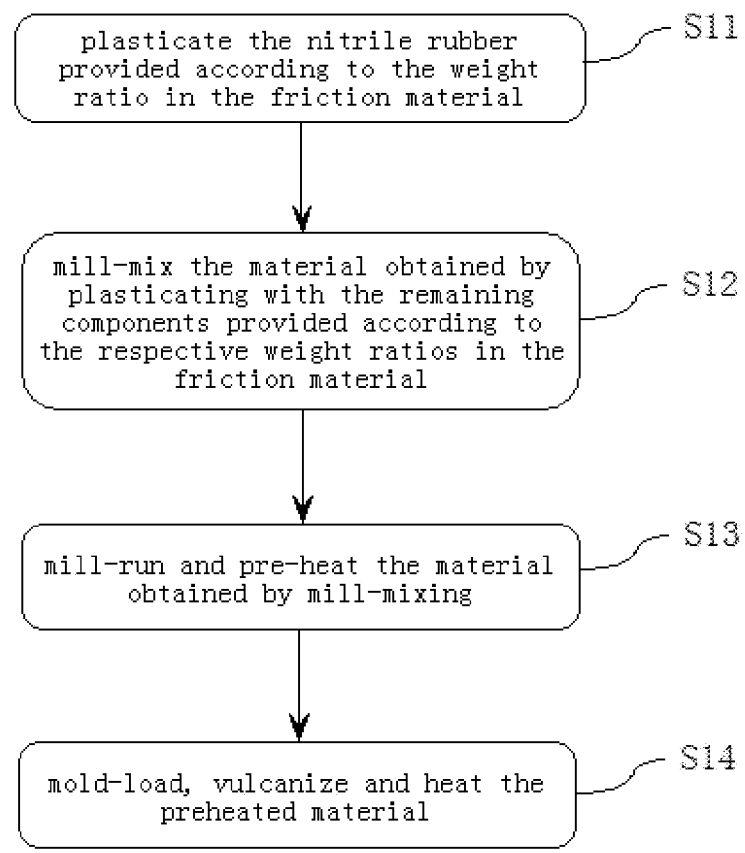

FRICTION MATERIAL AND PREPARATION METHOD THEREFOR, AND FRICTION PART

FOREIGN PRIORITY

This application claims priority to Chinese Patent Application No. 202111292801.6, filed Nov. 3, 2021, and all the benefits accruing therefrom under 35 U.S.C. § 119, the contents of which in its entirety are herein incorporated by reference.

TECHNICAL FIELD

The present disclosure relates to the technical field of materials, in particular to a friction material, a preparation method therefor, and a friction part.

BACKGROUND

Many friction materials have been provided in the prior art, and they are widely used in various occasions. For example, in a large number of electromechanical devices such as power devices, transmission devices, or braking devices, some parts (such as friction wheels, friction pads, etc.) made of suitable friction materials are usually provided to transmit or absorb power, reduce wear, reduce vibration, impact and noise by means of friction action, so as to promote these electromechanical devices to work and operate for a long period more stably, safely and reliably.

Friction materials and their products have the significance of further research and improvement in terms of, for example, performance, manufacturing process, production and use costs, etc.

SUMMARY

In view of the foregoing, the present disclosure provides a friction material, a preparation method therefor, and a friction part, which can solve or at least alleviate one or more of the above problems and other problems in the prior art, or can provide alternative technical solutions for the prior art.

First, according to an aspect of the present disclosure, a friction material is provided, which contains the following components by weight percentage: 24%-31% of a nitrile rubber, 0.35%-1% of a vulcanizing agent, 0.35%-0.6% of a vulcanization activator, 0.4%-0.8% of a promoter, 0.06%-0.11% of a scorch inhibitor, 1.5%-2.4% of ZnO, 24%-31% of a thermoplastic phenolic resin, 1.5%-2.2% of a plasticizer and 15%-25% of white carbon black, and optionally: 0%-25% of a filler, 0-0.8% of an anti-aging agent, and 0-2.4% of MgO.

In the friction material according to the present disclosure, optionally, the friction material contains: 10%-25% of the filler, 0.4%-0.8% of the anti-aging agent, and 1.5%-2.4% of MgO.

In the friction material according to the present disclosure, optionally, the filler is selected from one or more of calcium carbonate, aluminum hydroxide, aluminum oxide, titanium dioxide, and magnesium hydroxide, and/or the anti-aging agent is selected from one or more of anti-aging agent RD, anti-aging agent H, anti-aging agent AW, anti-aging agent MB, anti-aging agent BLE, anti-aging agent 4010NA, and anti-aging agent 124.

In the friction material according to the present disclosure, optionally, the friction material contains the following components by weight percentage: 26%-29% of the nitrile rubber, 0.35%-0.45% of the vulcanizing agent, 0.35%-0.6% of the vulcanization activator, 0.65%-0.8% of the promoter, 0.06%-0.11% of the scorch inhibitor, 1.6%-2.4% of ZnO, 26%-29% of the thermoplastic phenolic resin, 1.5%-2.2% of the plasticizer, 15%-25% of the white carbon black, 12%-24% of the filler, 0.4%-0.7% of the anti-aging agent, and 1.4%-2.3% of MgO.

In the friction material according to the present disclosure, optionally, the nitrile rubber is selected from one or more of high-acrylonitrile butadiene rubber and nitrile rubber N3305, with an acrylonitrile content of the high-acrylonitrile butadiene rubber being not less than 35%, and/or the friction material contains 25%-30% of the nitrile rubber, preferably 26%-29%.

In the friction material according to the present disclosure, optionally, the promoter is selected from one or more of promoter DM, promoter M, promoter CZ, promoter NS, promoter NOBS, promoter TMTD, promoter TETD, and/or the friction material contains 0.5%-0.8% of the promoter, preferably 0.6%-0.7%.

In the friction material according to the present disclosure, optionally, the plasticizer is selected from one or more of DOP and DEHP, and/or the friction material contains 1.6%-2.1% of the plasticizer, preferably 1.7%-2.0%.

In the friction material according to the present disclosure, optionally, the scorch inhibitor is selected from one or more of CTP, phthalic anhydride, benzoic acid, salicylic acid, succinic acid, oleic acid, oxalic acid, lactic acid, and/or the friction material contains 0.07%-0.11% of the scorch inhibitor, preferably 0.09%-0.11%.

In the friction material according to the present disclosure, optionally, the vulcanizing agent is selected from one or more of sulfur and sulfur donors, and/or the friction material contains 0.35%-0.9% of the vulcanizing agent, preferably 0.4%-0.75%.

In the friction material according to the present disclosure, optionally, the vulcanization activator is selected from one or more of stearic acid and zinc stearate, and/or the friction material contains 0.35%-0.6% of the vulcanization activator, preferably 0.4%-0.55%.

In addition, according to another aspect of the present disclosure, a method for preparing a friction material according to the present disclosure is also provided, which includes the following steps: plasticating the nitrile rubber provided according to the weight ratio in the friction material; mill-mixing the material obtained by plasticating with the remaining components provided according to the respective weight ratios in the friction material, in which the vulcanizing agent is first added for mill-mixing, then the vulcanization activator, the promoter, the scorch inhibitor, ZnO and the optional anti-aging agent and MgO are added for mill-mixing, and then the thermoplastic phenolic resin, the plasticizer, the white carbon black and the optional filler are added, in which the plasticizer is added before the white carbon black and the optional filler are added; milling-running and pre-heating the material obtained by mill-mixing; and mold-loading, vulcanizing and heating the preheated material to obtain the friction material.

In the method for preparing the friction material according to the present disclosure, optionally, before plasticating and mill-mixing, each component provided according to the respective weight ratio in the friction material is pre-dried.

In the method for preparing the friction material according to the present disclosure, optionally, the temperatures of plasticating and mill-mixing are each not higher than 100° C., a range of plasticating time is 2-10 minutes, and a range of mill-mixing time is 10-25 minutes.

In the method for preparing the friction material according to the present disclosure, optionally, the material obtained by mill-mixing is mill-run for at least 4 times, two consecutive mill-runnings are separated by a preset time, and a range of the preset time is 16-24 hours.

In the method for preparing the friction material according to the present disclosure, optionally, the preheating is to preheat continuously for 10-60 minutes in a temperature range of 50° C. to 90° C.

In the method for preparing the friction material according to the present disclosure, optionally, the vulcanizing is to vulcanize for 25-35 minutes at a temperature of 150° C. to 160° C. and a pressure of 25-80 MPa, and the heating is performed for 60-130 minutes at a temperature of 180° C. to 200° C.

In addition, according to further another aspect of the present disclosure, a friction part is also provided, which is made of the friction material according to the present disclosure or which has a friction layer made of the friction material according to the present disclosure.

In the friction part according to the present disclosure, optionally, the friction part is a friction pad for contact with an elevator rope in an elevator.

From the following detailed description combined with the accompanying drawings, the principles, characteristics, features, advantages and the like of the technical solutions according to the present disclosure will be clearly understood. The friction material according to the present disclosure has many prominent advantages such as excellent performance, low cost, long service life and wide application range. It can not only provide good and stable wear resistance, corrosion resistance, high temperature resistance, tear resistance, creep resistance and other properties, but also is easy to be for example manufactured into various types of electromechanical product parts to transmit or absorb power, reduce wear and/or reduce vibration, impact and noise. In particular, as compared with the prior art, the friction material according to the present disclosure and its products have great cost advantages, and can significantly reduce manpower and material investments in terms of manufacture, use and maintenance, etc.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structural configurations described herein, and are not required to be drawn to scale.

FIG. 1 is a flowchart of an embodiment of a method for preparing a friction material according to the present disclosure.

DETAILED DESCRIPTION

It should be noted that the components, steps, characteristics, advantages and the like of the friction material, the preparation method therefor and the friction part according to the present disclosure will be described below by way of example. However, it should be understood that neither of the descriptions should be understood as limiting the present disclosure in any way In addition, for any single technical feature described or implied in the embodiments mentioned herein, the present disclosure still allows for any combination or deletion of these technical features (or equivalents thereof) without any technical obstacle. Therefore, it should be considered that these more embodiments according to the present disclosure are also within the scope recorded in this document. In addition, for the sake of brevity, general items commonly known to those skilled in the art, such as plasticating, mill-mixing or mill-running devices, and contents of nitrile rubber, vulcanizing agents, plasticizers, anti-aging agents and the like in terms of material properties, application and analogues or alternatives, will not be described in greater detail herein.

According to the solution of the present disclosure, a friction material is first provided, which can be used to manufacture various friction products, such as various friction parts used in lifting devices, braking machinery, transmission mechanisms, etc. By weight percentage, the friction material may contain the following components: 24%-31% of a nitrile rubber, 0.35%-1% of a vulcanizing agent, 0.35%-0.6% of a vulcanization activator, 0.4%-0.8% of a promoter, 0.06%-0.11% of a scorch inhibitor, 1.5%-2.4% of ZnO, 24%-31% of a thermoplastic phenolic resin, 1.5%-2.2% of a plasticizer and 15%-25% of white carbon black. In addition, as an optional case, the friction material may also contain the following components by weight percentage: 0%-25% of a filler, 0-0.8% of an anti-aging agent, and 0-2.4% of MgO.

The nitrile rubber is used as a base material in the friction material. Since it has good properties in terms of material oil resistance and material stability, when the above weight ratios are used in this embodiment, not only the above properties can be well provided for the friction material so that the friction products made of this friction material can be better adapted to such an oily environment when facing friction applications with a certain oiliness (such as elevator ropes with lubricating oil, mining machine cables and other parts), but also other components can be synergistically promoted to play their respective roles. As an optional case, the nitrile rubber used in the friction material of the present disclosure may be selected from one or more of high-acrylonitrile butadiene rubber (in which an acrylonitrile content is not less than 35%), nitrile rubber N3305 or other similar materials.

In the friction material, the thermoplastic phenolic resin and the nitrile rubber can be used together as the base material. The above ratio between them can advantageously improve the performance of nitrile rubber in heat aging resistance, oil resistance and tear resistance. At the same time, other components can also be promoted to better bond and infiltrate into the base material as a whole, which will for example be very helpful for making the corresponding vulcanization activators (such as stearic acid, zinc stearate, etc., or a combination thereof) better integrate into the system so as to achieve a more ideal effect of vulcanization and wear resistance.

The white carbon black is used as a reinforcing material to provide the friction material with properties in terms of mechanical strength. Through the above component ratios, the friction material can also have a good shear strength, tear resistance and processability, especially when used in combination with corresponding plasticizers (such as DOP (dioctyl phthalate), DEHP (diester phthalate), etc., or a combination thereof), nitrile rubber and phenolic resin, which can ensure that a sufficiently effective friction effect is provided without damaging the above-mentioned parts such as elevator ropes in contact with the friction product, thereby effectively reducing or even avoiding an adverse effect on the friction performance. In specific applications, the white carbon black may optionally be micron-sized white carbon black, nano-sized white carbon black, or a combination thereof.

As an optional case, the vulcanizing agent in the friction material may be selected from one or more of sulfur, sulfur donors or other analogues; the promoter may be selected from one of promoter DM, promoter M, promoter CZ, promoter NS, promoter NOBS, promoter TMTD, promoter TETD or other analogues, or any combination thereof; and the scorch inhibitor may be selected from one of CTP (N-(cyclohexylthio) phthalimide), phthalic anhydride, benzoic acid, salicylic acid, succinic acid, oleic acid, oxalic acid, lactic acid or other analogues, or any combination thereof. In the friction material according to the present disclosure, by setting the weight percentages of the vulcanizing agent, the promoter and the scorch inhibitor to be 0.35%-1%, 0.4%-0.8% and 0.06%-0.11% respectively, these components and other components can be advantageously promoted to play their respective roles synergistically, so that the friction material can have better and stable overall performance in terms of for example wear resistance, high temperature resistance, corrosion resistance, tear resistance, creep resistance, etc.

In addition, when ZnO and optional MgO with the above weight ratios are provided in the friction material, they can help optimize and improve the friction material to obtain better performance; for example, they can effectively promote the realization of anti-scorching and improve the vulcanization efficiency, etc., which help to improve the surface smoothness of the final friction material obtained by processes such as plasticating and mill-mixing. The method of preparing the friction material will be introduced in more detail below.

In the friction material, for the filler, it may be selected from one or more of calcium carbonate ($CaCO_3$), aluminum hydroxide ($Al(OH)_3$), aluminum oxide ($Al_2O_3$), titanium dioxide ($TiO_2$), magnesium hydroxide ($Mg(OH)_2$) or other analogues. In addition, for the anti-aging agent, it may be selected from one or more of anti-aging agent RD, anti-aging agent H, anti-aging agent AW, anti-aging agent MB, anti-aging agent BLE, anti-aging agent 4010NA, anti-aging agent 124 or other analogues. According to the solution of the present disclosure, the specific usage amounts of the filler and the anti-aging agent may be flexibly set as required in a range of 0-25% and 0-0.8%, respectively.

As mentioned above, the friction material obtained by using the above corresponding components and their weight ratios can not only have good and stable performance in terms of wear resistance, corrosion resistance, high temperature resistance, tear resistance, creep resistance, etc., but also has obvious cost advantages due to the suitable component ratios, thus making it have outstanding practical value and suitable for wide application in many fields.

The friction material according to the present disclosure will be described in detail below in conjunction with the following specific embodiments. It should be understood that unless otherwise specified, the same features or content appearing in different embodiments will not be described repeatedly.

First Embodiment

In this embodiment, the friction material may contain the following components by weight percentage: 24%-31% of a nitrile rubber, 0.35%-1% of a vulcanizing agent, 0.35%-0.6% of a vulcanization activator, 0.4%-0.8% of a promoter, 0.06%-0.11% of a scorch inhibitor, 1.5%-2.4% of ZnO, 24%-31% of a thermoplastic phenolic resin, 1.5%-2.2% of a plasticizer, 15%-25% of white carbon black, 0%-25% of a filler, 0-0.8% of an anti-aging agent, and 0-2.4% of MgO.

Second Embodiment

In this embodiment, the friction material may contain the following components by weight percentage: 26%-29% of a nitrile rubber, 0.35%-0.45% of a vulcanizing agent, 0.35%-0.6% of a vulcanization activator, 0.65%-0.8% of a promoter, 0.06%-0.11% of a scorch inhibitor, 1.6%-2.4% of ZnO, 26%-29% of a thermoplastic phenolic resin, 1.5%-2.2% of a plasticizer, 15%-25% of white carbon black, 12%-24% of a filler, 0.4%-0.7% of an anti-aging agent, and 1.4%-2.3% of MgO.

Third Embodiment

In this embodiment, the friction material may contain the following components by weight percentage: 25%-28% of a nitrile rubber, 0.35% to 0.5% of a vulcanizing agent, 0.4% to 0.6% of a vulcanization activator, 0.7%-0.8% of a promoter, 0.07%-0.1% of a scorch inhibitor, 1.6%-2.3% of ZnO, 26%-29% of a thermoplastic phenolic resin, 1.5%-2.2% of a plasticizer, 16%-24% of white carbon black, 14%-24% of a filler, 0.4-0.7% of an anti-aging agent, and 1.3-2.2% of MgO.

Fourth Embodiment

In this embodiment, the friction material may contain the following components by weight percentage: 24%-31% of a high-acrylonitrile butadiene rubber, 0.35%-1% of a sulfur, 0.35%-0.6% of a stearic acid, 0.4%-0.8% of a promoter DM, 0.06%-0.11% of a scorch inhibitor CTP, 1.5%-2.4% of ZnO, 24%-31% of a thermoplastic phenolic resin, 1.5%-2.2% of a plasticizer DOP, 15%-25% of micron-sized white carbon black, 10%-25% of $CaCO_3$, 0.4%-0.8% of an anti-aging agent, and 1.5%-2.4% of MgO.

It should be noted that the above several embodiments are only used for illustrative purpose. Within the ranges of the component ratios of the friction material according to the present disclosure, any one or more of the listed components contained therein can be flexibly set based on specific needs.

For example, by weight percentage, the nitrile rubber may be set to 25%-30%, optionally 26%-29%, such as 25%, 25.5%, 26%, 26.5%, 27%, 27.5%, 28%, 28.5%, 29%, 29.5%, etc., and so on. Similarly, the vulcanization activator may be set to 0.35%-0.6%, optionally 0.4%-0.55%, such as 0.35%, 0.38%, 0.4%, 0.45%, 0.5%, 0.55%, 0.58%, etc. Similarly, the plasticizer may be set to 1.6%-2.1%, optionally 1.7%-2.0%, such as 1.65%, 1.7%, 1.75%, 1.8%, 1.85%, 1.9%, 1.95%, etc. Similarly, the vulcanizing agent may be set to 0.35%-0.9%, optionally 0.4%-0.75%, such as 0.45%, 0.5%, 0.55%, 0.6%, 0.65%, 0.7%, etc. Similarly, the promoter may be set to 0.5%-0.8%, preferably 0.6%-0.7%, such as 0.55%, 0.65%, 0.7%, 0.75%, etc. Similarly, the scorch inhibitor may be set to 0.07%-0.11%, optionally 0.09%-0.11%, such as 0.08%, 0.09%, 0.1%, etc. It should be pointed out that the description of any specific value in this document should be understood to include any non-substantive error involved in it; for example, it may include a range of ±8%, ±5%, or ±2% of the specific value.

According to the technical solution of the present disclosure, a corresponding method for preparing the friction material according to the present disclosure is also provided.

As an example, as shown in FIG. 1, in an embodiment of the method for preparing the friction material, the following steps may be included:

In step S11, a nitrile rubber may be provided according to the weight ratios of the components in the friction material of the present disclosure and plasticated. In the foregoing, the content configuration, selection and use of the nitrile rubber have been discussed in detail, and will not be described repeatedly herein.

Generally speaking, the raw material of nitrile rubber is plasticated in a conglomerated form (or granular or powder form), and before the plastication starts, the raw material of nitrile rubber can optionally be pre-dried according to the actual situation. For example, the raw material of the nitrile rubber can be heated and dried in an electric oven.

During the plastication, the mill-mixing temperature may be optionally controlled to be within a temperature range of for example not higher than 100° C., and the plastication time may be optionally controlled to be within 2-10 minutes, such as 3 minutes, 5 minutes, 6 minutes, 8 minutes, etc. The specific conditions may be flexibly set according to actual needs.

In step S12, the material obtained by the plastication in step S11 can be mill-mixed with the remaining components in the friction material according to the present disclosure. The above components are all provided according to their respective corresponding weight ratios in the friction material. For example, the vulcanizing agent (such as sulfur, etc.) in the friction material is set in the range of 0.35%4% of the total weight of the friction material as described above. For these components, an electric oven or the like may be optionally used to pre-dry the raw materials of one or more components according to the actual situation.

For the mill-mixing operation, the temperature may be optionally controlled to be within a temperature range of for example not higher than 100° C., and the mill-mixing time may be optionally controlled to be within 10-25 minutes, such as 12 minutes, 15 minutes, 20 minutes, 22 minutes, etc. The specific conditions may be flexibly set according to actual needs.

During the mill-mixing operation, the vulcanizing agent is first added and then mill-mixed with the plasticized nitrile rubber, for example, mill-mixing for 5 minutes or any other suitable time, which can promote improvement of the properties of the nitrile rubber after vulcanization, especially in terms of elasticity, thermoviscosity, strength, etc., so as to facilitate better and full integration with other components added later.

Then, the vulcanization activator, promoter, scorch inhibitor, ZnO, anti-aging agent (if any) and MgO (if any) may be added to the material which is being mill-mixed. For the above components, they are all provided according to their respective weight ratios in the friction material, usually in the form of powder or granules, etc. The method of the present disclosure does not impose any restriction on the order of adding these components during mill-mixing. They can be added separately, or several or all of the components can be mixed together and then added at the same time for mill-mixing.

Next, the thermoplastic phenolic resin, plasticizer, white carbon black and filler (if any) can be further added to the material which is being mill-mixed. The above components are all provided according to their respective weight ratios in the friction material, usually in the form of powder or granules, etc. For the plasticizer, it is proposed by the present disclosure to add it before the white carbon black and filler (if any). After a lot of research, the inventor of the present disclosure found that by combining the above steps and the corresponding component ratios, the components in the friction material can be very effectively and actively promoted to interact with each other, thereby achieving better overall performances over the prior art in terms of wear resistance, corrosion resistance, high temperature resistance, strength, toughness, etc.

In step S13, the material obtained after step S13 may be mill-run, and then pre-heated. The specific times of mill-running may be selected and set according to needs; for example, mill-running can be performed for 4 times, 5 times, 8 times or more, and there is a certain time interval between two consecutive mill-runnings. The specific time interval may be set according to actual needs; for example, it may be set to 16-24 hours or other suitable time. In addition, the preheating may be controlled to be within a temperature range of, for example, 50° C. to 90° C., and the preheating can last, for example, for 10-60 minutes, etc. The specific temperature and time settings can be selected and determined as needed. For example, when the material has a relatively large size (such as thickness), it can be preheated at a relatively high temperature for a relatively long time.

In step S14, the material obtained after the above steps may be subjected to mold loading, vulcanizing and heating, thereby obtaining the friction material according to the present disclosure. When the material is mold-loaded, requirements on the specific shape and structure and the like of the mold used are set according to needs. For example, the material can be molded into a sheet shape, a block shape or other required shapes, so that the resulting friction material can be used to manufacture the required friction products.

In addition, for the vulcanizing, as an optional case, it can be performed under a temperature condition of 150° C. to 160° C. (such as 152° C., 155° C., 158° C., etc.) and a pressure condition of 25 MPa to 80 MPa, and the specific sulfur treatment time can be controlled according to actual application conditions (for example, the thickness of the molded part, etc.). For example, in some embodiments, the time can be controlled at 25-35 minutes (such as 28 minutes, 30 minutes, etc.).

In addition, for the heating, as an optional case, it can be performed at a temperature condition of 180° C. to 200° C. (such as 185° C., 190° C., 195° C., etc.), and the specific treatment time can also be set according to the actual application conditions (for example, the thickness of the molded part, etc.). For example, in some embodiments, the time can be controlled at 60-130 minutes (such as 70 minutes, 85 minutes, 90 minutes, 100 minutes, 115 minutes, 120 minutes, 125 minutes, etc.).

As mentioned above, the present disclosure innovatively proposes a friction material and a preparation method therefor, which can have both material performance and cost advantages. According to tests, the friction material can be prepared in a rather cost-effective manner, and it has excellent performance in particular in terms of wear resistance, etc., which can fully meet the requirements on use. Moreover, it can replace existing similar friction material products. The cost of the product made by adopting the solution of the present disclosure will not exceed one sixth of that of existing products of the same type, thus having a major cost advantage and competitiveness.

The following Tables 1 and 2 respectively list test comparison data of the friction material of the present disclosure and an existing friction material (model D670). During the test, the test pieces in the two groups of test samples have the same structure. Specifically, they are used in friction pads (having a diameter of 22.4 mm and a length of 50 mm) in the elevator. The friction pads are sleeved on a sheave when in use so that they are in frictional contact with an elevator rope. The elevator rope will apply a force to the friction pads, which may result in friction loss of the friction pads.

The data in Table 1 shows that under the same test conditions, a simulation device in the test environment applies the same load of a 250 kg weight to the two groups of test samples (i.e., the friction pad made of D670 material, and a first example of the friction pad made of the friction material of the present disclosure) respectively at a speed of 2 mm/s and runs the samples for 10 m. After 50 times of the test, a coefficient of friction of the first example of the friction pad obtained through the test is in a range of 0.112-0.121, which is almost exactly the same as the corresponding range of 0.114-0.121 of the coefficient of friction of the existing friction pad made of D670 material with a higher cost, and the performances of the two are basically equivalent.

TABLE 1

| | Test sample | | Test conditions | | | Test result: Friction |
|---|---|---|---|---|---|---|
| Material | Diameter (mm) | Length (mm) | Force (kg) | Speed (mm/s) | Distance (m) | Coefficient (COF) |
| D670 | 22.4 | 50 | 250 | 2 | 10 | 0.114-0.121 |
| Example I | 22.4 | 50 | 250 | 2 | 10 | 0.112-0.121 |

The data in Table 2 shows that under the same test conditions, a simulation device in the test environment applies the same load of a 350 kg weight to the two groups of test samples (i.e., the friction pad made of D670 material, and a second example of the friction pad made of the friction material of the present disclosure) respectively at a speed of 20 mm/s and runs the samples for 1600 m. After 50 times of the test, a wear amount of the second example of the friction pad obtained through the test is in a range of 14-53 mg, which is also substantially the same as the corresponding range of 16-46 mg of the wear amount of the existing friction pad made of D670 material with a higher cost. The present disclosure even has a slight advantage in the minimum wear amount obtained through the test compared with the prior art.

TABLE 2

| | Test sample | | Test conditions | | | Test result: Wear |
|---|---|---|---|---|---|---|
| Material | Diameter (mm) | Length (mm) | Force (kg) | Speed (mm/s) | Distance (m) | amount (mg) |
| D670 | 22.4 | 50 | 350 | 20 | 1600 | 16-46 |
| Example II | 22.4 | 50 | 350 | 20 | 1600 | 14-53 |

The above test data fully shows that the friction material provided by the present disclosure, the preparation method therefor and the products made of the friction material can fully meet the performance requirements of existing friction materials in terms of friction performance, and therefore the friction material provided by the present disclosure can be used to replace existing friction materials, which can bring considerable cost effectiveness and practicality.

In addition, the present disclosure further provides a friction part, which can be made of the friction material according to the present disclosure, or it can be provided with such a friction layer that is made of the friction material according to the present disclosure. In practical applications, the specific shape, structure, size and the like of the friction part (or friction layer) can be designed according to specific application requirements, and the present disclosure does not impose any limitation on this.

Since the friction material of the present disclosure has the advantages described above in terms of performance, cost, etc., which are significantly superior to the prior art, the friction part of the present disclosure can be widely used in many applications. For example, the friction part can be used in electromechanical devices such as elevators. For example, it can be used as a friction pad in elevator devices, which comes into contact with the elevator rope. For example, friction pad is directly sleeved on the elevator sheave in a replaceable manner. Since the friction material of the present disclosure has significant performance and cost advantages, the friction pad made of the friction material can be used to replace the existing friction pads, which can ensure the working performance and at the same time help to promote the elevator rope to have a longer service life, guarantee the safety performance of the elevator system and reduce maintenance costs.

The friction material, the preparation method therefor, and the friction part according to the present disclosure have been elaborated above in detail by way of example only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. A friction material, containing the following components by weight percentage: 24%-31% of a nitrile rubber, 0.35%-1% of a vulcanizing agent, 0.35%-0.6% of a vulcanization activator, 0.4%-0.8% of a promoter, 0.06%-0.11% of a scorch inhibitor, 1.5%-2.4% of ZnO, 24%-31% of a thermoplastic phenolic resin, 1.5%-2.2% of a plasticizer and 15%-25% of white carbon black, and optionally: 0%-25% of a filler, 0-0.8% of an anti-aging agent, and 0-2.4% of MgO.

2. The friction material according to claim 1, containing: 10%-25% of the filler, 0.4%-0.8% of the anti-aging agent, and 1.5%-2.4% of MgO.

3. The friction material according to claim 2, wherein the filler is selected from one or more of calcium carbonate, aluminum hydroxide, aluminum oxide, titanium dioxide, and magnesium hydroxide.

4. The friction material according to claim 1, wherein the friction material contains the following components by weight percentage: 26%-29% of the nitrile rubber, 0.35%-0.45% of the vulcanizing agent, 0.35%-0.6% of the vulcanization activator, 0.65%-0.8% of the promoter, 0.06%-0.11% of the scorch inhibitor, 1.6%-2.4% of ZnO, 26%-29% of the thermoplastic phenolic resin, 1.5%-2.2% of the plasticizer, 15%-25% of the white carbon black, 12%-24% of the filler, 0.4%-0.7% of the anti-aging agent, and 1.4%-2.3% of MgO.

5. The friction material according to claim 1, wherein the nitrile rubber is selected from one or more of high-acrylonitrile butadiene rubber and nitrile rubber, with an acrylonitrile content of the high-acrylonitrile butadiene rubber being not less than 35%, and/or the friction material contains 25%-30% of the nitrile rubber.

6. The friction material according to claim 1, wherein the friction material contains 0.5%-0.8% of the promoter.

7. The friction material according to claim 1, wherein the plasticizer is selected from one or more of DOP and DEHP, and/or the friction material contains 1.6%-2.1% of the plasticizer.

8. The friction material according to claim 1, wherein the scorch inhibitor is selected from one or more of CTP, phthalic anhydride, benzoic acid, salicylic acid, succinic acid, oleic acid, oxalic acid, lactic acid, and/or the friction material contains 0.07%-0.11% of the scorch inhibitor.

9. The friction material according to claim 1, wherein the vulcanizing agent is selected from one or more of sulfur and sulfur donors, and/or the friction material contains 0.35%-0.9% of the vulcanizing agent.

10. The friction material according to claim 1, wherein the vulcanization activator is selected from one or more of stearic acid and zinc stearate, and/or the friction material contains 0.35%-0.6% of the vulcanization activator.

11. A method for preparing the friction material according to claim 1, comprising:
 plasticating the nitrile rubber provided according to the weight ratio in the friction material;
 mill-mixing the material obtained by plasticating with the remaining components provided according to the respective weight ratios in the friction material, wherein the vulcanizing agent is first added for mill-mixing, then the vulcanization activator, the promoter, the scorch inhibitor, ZnO and the optional anti-aging agent and MgO are added for mill-mixing, and then the thermoplastic phenolic resin, the plasticizer, the white carbon black and the optional filler are added, and wherein the plasticizer is added before the white carbon black and the optional filler are added;
 milling-running and pre-heating the material obtained by mill-mixing; and
 mold-loading, vulcanizing and heating the preheated material to obtain the friction material.

12. The method for preparing the friction material according to claim 11, wherein before plasticating and mill-mixing, each component provided according to the respective weight ratio in the friction material is pre-dried.

13. The method for preparing the friction material according to claim 11, wherein the temperatures of plasticating and mill-mixing are each not higher than 100° C., a range of plasticating time is 2-10 minutes, and a range of mill-mixing time is 10-25 minutes.

14. The method for preparing the friction material according to claim 11, wherein the material obtained by mill-mixing is mill-run for at least 4 times, two consecutive mill-runnings are separated by a preset time, and a range of the preset time is 16-24 hours.

15. The method for preparing the friction material according to claim 11, wherein the preheating is to preheat continuously for 10-60 minutes in a temperature range of 50° C. to 90° C.

16. The method for preparing the friction material according to claim 11, wherein the vulcanizing is to vulcanizate for 25-35 minutes at a temperature of 150° C. to 160° C. and a pressure of 25-80 MPa, and the heating is performed for 60-130 minutes at a temperature of 180° C. to 200° C.

17. A friction part, which is made of the friction material according to claim 1.

18. The friction part according to claim 17, wherein the friction part is a friction pad for contact with an elevator rope in an elevator.

* * * * *